3,095,693
OXIDIZER COMPRISING TETRANITROMETHANE AND NITROGEN PENTOXIDE AND METHOD OF PRODUCING THRUST THEREWITH
Christian A. Wamser, Berkeley Heights, N.J., assignor to Air Reduction Company, Incorporated, New York, N.Y., a corporation of New York
No Drawing. Filed Feb. 9, 1960, Ser. No. 7,527
3 Claims. (Cl. 60—35.4)

This invention relates to novel oxidants or oxidizers and is more particularly concerned with oxidizers which have special utility in the field of rocket propellants.

A rocket is a self-contained power plant which is capable of converting the energy released by a chemical reaction into a high-velocity stream of gas molecules which is directed through a nozzle to produce a thrust. The chemical reaction is the combustion of a fuel and an oxidizer, which, in admixture, are designated as the propellant. The fuel and the oxidizer are carried by the rocket and the rocket thus contains all of the materials necessary for sustaining chemical combustion. The rocket does not rely upon an external source of oxygen and is thus independent of the atmosphere. It will be obvious that a desirable propellant is one which, for minimum weight and volume, will supply maximum energy upon combustion.

It is well known that propellants useful for propelling rockets and the like are becoming increasingly important and a continuing aim is to provide propellants which have increased thrust. Particularly important is the need for an oxidizer which provides a high percentage of oxygen per unit of weight or volume, and ease of preparation, handling and storage are only a few of the additional important desirable advantages sought in propellant oxidizers.

Various liquid fuels have been proposed for use in rockets, such as ethyl alcohol, aniline, hydrazine hydrate, unsymmetrical dimethyl hydrazine, gasoline, furfural alcohol and like well-known compounds. Liquid fuels are best used with liquid oxidizers and are injected into the combustion chamber of the rocket from storage tanks carried by the rocket. Among the advantages of liquid propellants are longer firing duration and the possibility of intermittent operation, whereby combustion can be stopped and started at desired intervals by controlling the flow of fuel and oxidizer.

In order to be suitable for use in propelling rockets and the like, however, propellants must possess very definite and specific properties. The propellant must, for example, have high specific thrust or impulse, which is defined as the amount of thrust in pounds that can be obtained from each pound of propellant consumed per second. The propellant, and particularly the oxidizer, must also be stable under the conditions normally encountered in handling and storing the propellant components before use.

In view of the above-mentioned requirements, only a few oxidizers have found acceptance, despite the growing importance and criticality of the need for effective oxidizers, and the search for suitable compositions of this type has been a continuing one.

Among the liquid oxidants or oxidizers which have been proposed for use with liquid fuels in liquid propellant rockets, the most commonly used are liquid oxygen and nitric acid. Liquid oxygen, however, presents serious problems from the standpoint of handling and storage because of its very low boiling point, and its low temperature also causes water vapor from the surrounding atmosphere to collect and freeze on pipes and valves, and nitric acid similarly presents handling and storage problems, although the problem of low temperature is not involved.

Nitrogen pentoxide ($N_2O_5$) has a high oxygen to nitrogen ratio which is desirable in a propellant oxidizer but it is a solid at room temperature and cannot therefore, be used in the manner of liquid oxidizers. Dissolving it in conventional solvents, however, causes $N_2O_5$ to lose its desirable characteristics and it is rendered unsuitable for its intended use. There is an important need, therefore, for means to provide $N_2O_5$ in liquid form while retaining its desirable characteristics.

It is an object of this invention to provide a novel oxidizing composition.

Other objects will be apparent from the following detailed description of the invention.

It has now been found that a highly effective liquid oxidizer which is suitable for use as a component of a liquid rocket propellant can be provided by combining nitrogen pentoxide with tetranitro methane. The tetranitro methane has a solvating action upon nitrogen pentoxide and the two compounds combine to produce a composition which is liquid at room temperature, e.g. 20° C. which has a high density and a high specific impulse. Tetranitro methane is a highly explosive substance but it has been found that when it is combined with nitrogen pentoxide a highly-stable, safely handled composition is produced which has a very low freezing point.

Tetranitro methane may be combined in varying proportions but preferably not more than 20% by weight of tetranitro methane is used in order to avoid excessive dilution of $N_2O_5$ with a less effective oxidizer, although up to 50% by weight could be used. Enough tetranitro methane is employed to form a solution with the solid nitrogen pentoxide at room temperature and advantageously at least 10% by weight is used.

The two compounds are suitably combined by simple mechanical mixing, normal precautions being taken in the handling of the tetranitro methane. The resulting product which, as mentioned, is readily handled with complete safety can then be packaged and shipped without difficulty.

When combined with a liquid fuel of any desired type, such as those enumerated above, a high quality liquid propellant is provided having a high specific impulse, and desirable characteristics. By reason of the high density of the product and its oxygen content, it has a very high oxygen ratio per unit volume.

The following specific example will serve to illustrate further the present invention.

In a mixing vessel provided with a manual stirrer and maintained at 20° C. there were introduced 20 parts by weight of tetranitro methane, and 80 parts by weight of nitrogen pentoxide were gradually introduced into the vessel and mixed with the liquid tetranitro methane over a period of a few minutes.

The resultant product was found to have a freezing point of −7° C., a density corresponding to the densities of the two components, and it provides a propellant having a specific impulse value of 273. In the foregoing, specific thrust and specific impulse, which have been used interchangeably, refer to this characteristic as applied to the propellant containing the oxidizer of the invention and the specific values referred to apply to the combination of the oxidizer with hydrazine as the fuel. When the oxidizer is used with a liquid fuel to form a propellant, the proportions are those normally employed and applicable to the particular fuel involved as described, for example, in "Rocket Propulsion Elements" by George P. Sutton, 2nd edition 1956.

It will be understood that various changes and modifications may be made in the foregoing description without departing from the scope of the invention as defined in the appended claims and it is intended, therefore, that all matter contained in the foregoing description shall be interpreted as illustrative only and not as limitative of the invention.

What I claim and desire to secure by Letters Patent is:

1. A normally-liquid oxidizing composition consisting essentially of about 10 to 20% by weight of tetranitro methane and about 80–90% by weight of nitrogen pentoxide.

2. A normally liquid oxidizing composition consisting essentially of up to 20% by weight of tetranitro methane and at least 80% by weight of nitrogen pentoxide.

3. A method for producing thrust which comprises injecting into a combustion chamber of a rocket a liquid fuel and a liquid oxidizer consisting essentially of about 10 to 20% by weight of tetranitro methane and about 80 to 90% by weight of nitrogen pentoxide, reacting said fuel and said oxidizer to produce a gas and directing said gas through a nozzle.

References Cited in the file of this patent

UNITED STATES PATENTS 2,403,932    Lawson _____ July 16, 1946

OTHER REFERENCES

Tschinkel: Ind. and Eng. Chem., vol. 48, No. 4, pp. 732–735, April 1956.

Stosick: Ind. and Eng. Chem., vol. 48, No. 4, pp. 722–724, April 1956.